March 7, 1950     G. H. TWENEY ET AL     2,500,015

FRAME STRUCTURE FOR AIRPLANES

Filed Feb. 2, 1945     2 Sheets-Sheet 1

INVENTOR.
RAYMOND J. MILLER
GEORGE H. TWENEY
BY
*J. H. Fowler*
ATTORNEY

March 7, 1950 G. H. TWENEY ET AL 2,500,015
FRAME STRUCTURE FOR AIRPLANES

Filed Feb. 2, 1945 2 Sheets-Sheet 2

INVENTOR.
RAYMOND J. MILLER
GEORGE H. TWENEY
BY
O. H. Fowler
ATTORNEY

Patented Mar. 7, 1950

2,500,015

UNITED STATES PATENT OFFICE 2,500,015

FRAME STRUCTURE FOR AIRPLANES

George H. Tweney and Raymond J. Miller, Detroit, Mich., assignors to Bendix Aviation Corporation, Detroit, Mich., a corporation of Delaware Application February 2, 1945, Serial No. 575,783

2 Claims. (Cl. 244—119)

This invention relates to airplanes, and more particularly to the frame structure thereof.

Broadly the invention comprehends a frame for the fuselage and wings of an airplane characterized in that the frame is of unitary structure possessing maximum rigidity and strength with minimum weight and complexity.

An object of the invention is to provide a primary frame for an airplane of such structure as to amply support the major load of the airplane.

A feature of the invention is a primary frame for an airplane including a unitary member including corresponding oppositely disposed wing spars.

Another feature of the invention is a primary frame for an airplane including a unitary keel, a member including wing spars.

Other objects and features of the invention will appear from the following description taken in connection with the accompanying drawings forming a part of this specification, and in which—

Figure 1:
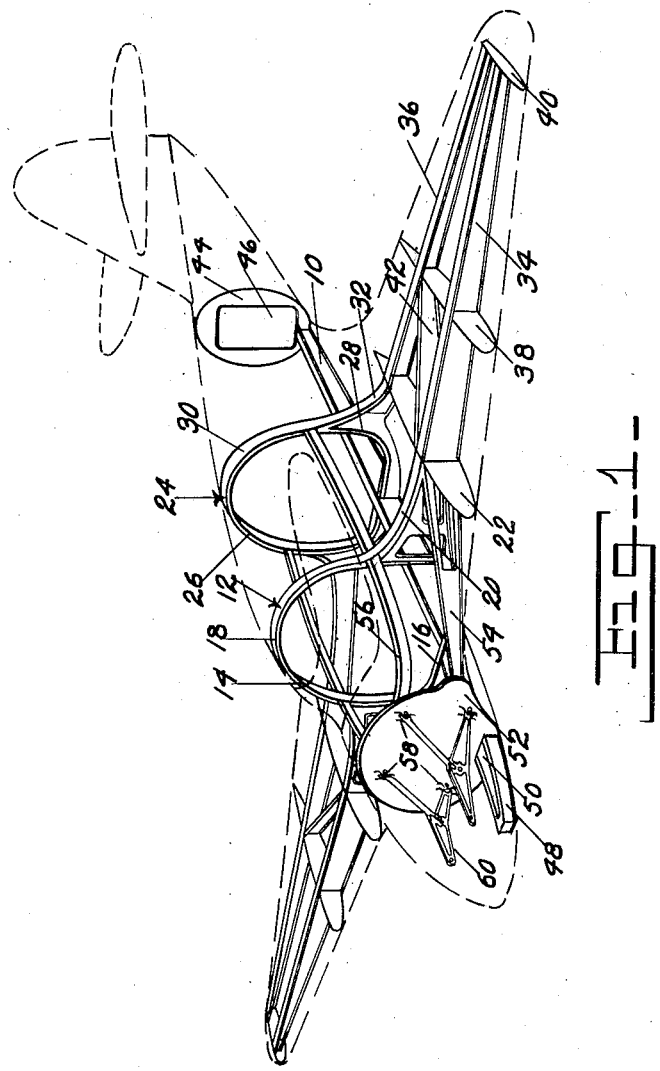
Fig. 1 is a perspective view of the primary frame structure of an airplane embodying the invention.
Figure 2:
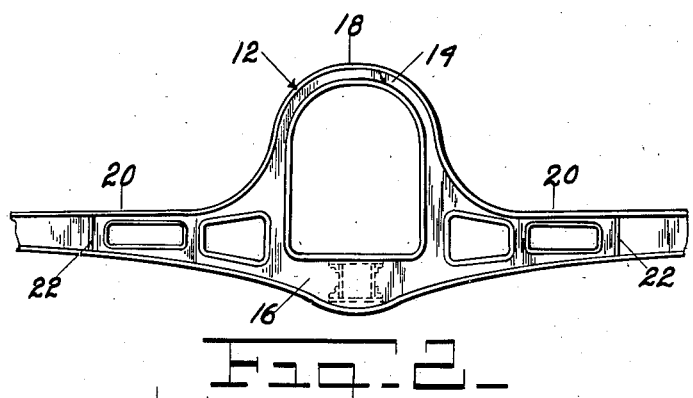
Fig. 2 is a front elevation of the main member partly broken away.
Figure 3:
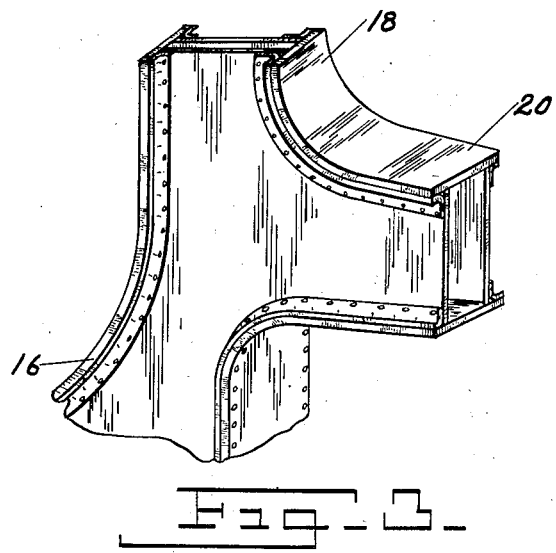
Fig. 3 is an enlarged fragmentary view.

Referring to the drawings for more specific details of the invention, 10 represents a keel, preferably a beam of the box type; however, a beam of any other type may be used with satisfactory results. This keel in effect constitutes the backbone of the frame structure of the airplane.

A main member indicated generally at 12 is transversely disposed to the keel at the forward end thereof and rigidly secured thereto in any suitable manner. This main member is one of the important features of the instant invention.

As shown, the main member includes a ring 14 of such contour as to correspond to a cross-section of the fuselage of the airplane for which the frame is intended. That section of the ring adjoining the keel constitutes a unitary rib 16 having alike sections on each side of the keel, and the remaining portion of the ring constitutes what is generally known in the art as a crash arch 18 characterized in that it is a continuum of wing spars 20 which in the instant invention are sectionalized at the mean aerodynamic chords coincident with wing ribs 22 so that the wing proper may be detached.

A secondary member indicated generally at 24 is secured to the keel in spaced relation to and back of the main member and is alike in structure to the main member except that it is somewhat smaller so that it may conform to the shell of the fuselage as shown in outline.

The secondary member includes a ring 26, characterized in that corresponding sections of the ring adjoining the keel 10 constitute ribs 28 and the remaining portion of the ring constitutes a crash arch continuum with wing spars 32 deflected forwardly to the mean aerodynamic chord where they adjoin the wing ribs 22.

The frame structure for the wings proper includes alike spars 34 and 36 contiguous with the spars 20 and 32. The spars 34 and 36 are secured together by spaced wing ribs 38 and 40 and are suitably braced as by struts 42.

A bulkhead 44 suitably secured to the keel 10 at the rear end thereof includes a unitary member having a profile complementary to the wall of the fuselage at the particular location in which it is positioned, and the bulkhead has a suitable opening 46 therethrough to be closed as by a conventional door, not shown.

An auxiliary keel 48 also of the box type structure adjoins the main member 12 and extends therefrom forwardly and slightly upward in a vertical plane through the longitudinal axis of the main keel 10. The auxiliary keel is bifurcated as at 50 for the reception of a landing gear, not shown.

The auxiliary keel 48 serves to support a fire wall 52 which is further supported by struts 54 adjoining the wing spars 20 substantially at the mean aerodynamic chords, and the fire wall is also supported by a rail 56 also adjoining the main member substantially at its juncture with the ribs 16 and the crash arch 18.

The struts 54 and the rail 56 support the fire wall 52 immediately opposite suitable brackets 58 for an engine support 60 so as to lend strength and rigidity to the engine support.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what we claim as new and desire to secure by Letters Patent is:

1. A primary frame for an airplane comprising a keel, a main member including corresponding oppositely disposed wing spars secured to the forward end of the keel, a bulkhead secured to the rear end of the keel, a secondary member including corresponding oppositely disposed wing spars secured to the keel between the main member and the bulkhead, an auxiliary keel forward of the keel, a fire wall supported by the auxiliary keel, and struts between the fire wall and the main member.

2. A primary frame for an airplane comprising a main keel, a main member secured to the forward end of the keel including ribs, a crash arch and wing spars integral with one another, a bulkhead secured to the rear end of the main keel, a secondary member similar to the main member secured to the keel between the main member and the bulkhead, a bifurcated auxiliary keel forward of the main keel, a fire wall supported thereon, struts between the main member and the fire wall, and means on the fire wall for support of an engine.

GEORGE H. TWENEY.
RAYMOND J. MILLER.

REFERENCES CITED

The following references are of record in the file of this patent:

UNITED STATES PATENTS

| Number | Name | Date |
|---|---|---|
| 1,516,295 | Huntington | Nov. 18, 1924 |
| 2,001,260 | Martin | May 14, 1935 |
| 2,132,529 | Firner | Oct. 11, 1938 |
| 2,183,323 | Moss | Dec. 12, 1939 |
| 2,316,622 | Richard | Apr. 13, 1943 |

FOREIGN PATENTS

| Number | Country | Date |
|---|---|---|
| 455,352 | France | May 22, 1913 |
| 467,670 | Great Britain | June 14, 1937 |